J. A. JONES.
Drill-Point for Seed-Drill.
No. 216,189.  Patented June 3, 1879.
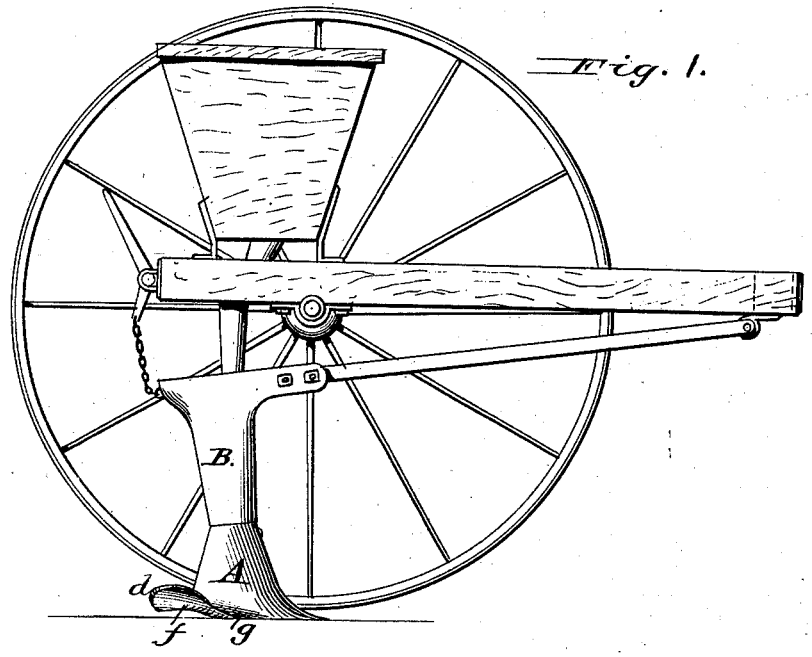
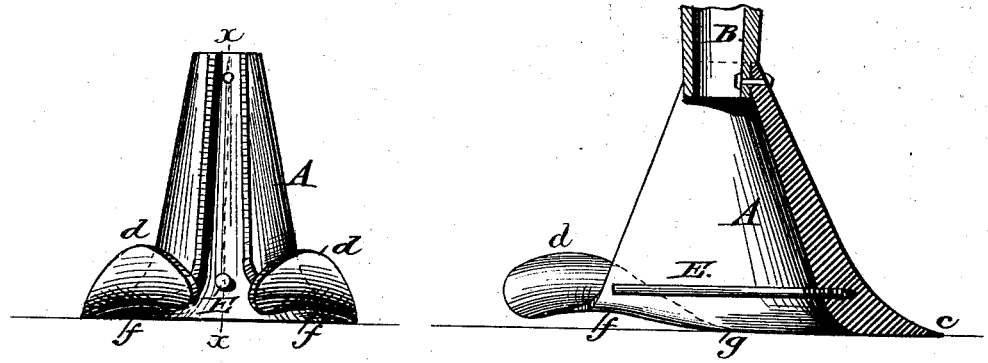
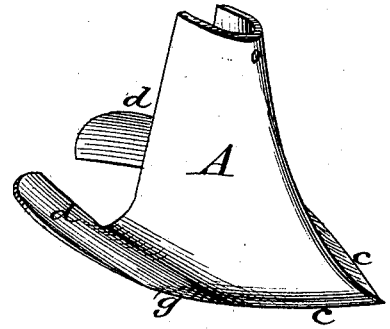
Attest:
H. B. Perrine,
Albert H. Norris
John A. Jones.
Inventor.
By James L. Norris.
Atty.

UNITED STATES PATENT OFFICE.

JOHN A. JONES, OF MOUNT PLEASANT, DELAWARE.

IMPROVEMENT IN DRILL-POINTS FOR SEED-DRILLS.

Specification forming part of Letters Patent No. 216,189, dated June 3, 1879; application filed January 4, 1879.

*To all whom it may concern:*

Be it known that I, JOHN A. JONES, of Mount Pleasant, in the county of New Castle and State of Delaware, have invented certain new and useful Improvements in Drill-Points for Seed-Drills, of which the following is a specification.

This invention relates to an improvement in that class of drill-boot points which are adapted to form wide shallow furrows for the reception of seed-wheat and similar grain.

Its object is to form a wide furrow having a perfectly flat bottom, upon which the seed will lie as it falls from a spreader, and will not roll to the center; to so form the rear portion of the point that it will efficiently cover and not disturb or crowd the seed inward toward the center of the furrow, and to provide for the covering of the seed, as it is spread, with moist mellow soil, instead of with dry surface-earth, as has heretofore been the case.

It consists in a drill-boot point provided with an outwardly-projecting bottom flange or lip diverging from the front edge of the point on each side thereof to near its rear, and then converging and extending rearward beyond the back of the point, the converging portions being turned to an upwardly and outwardly oblique position, so as to throw earth inwardly upon the furrow and cover the seed, and having their bottom surfaces inclined upward at a slight angle to the forward bottom surface of the point, in order to pass over and not disturb the grain or seed which has been spread in the furrow.

In the accompanying drawings, Figure 1 is a side elevation of a grain-drill having my improved boot-point. Fig. 2 is a rear view of the point detached. Fig. 3 is a section through the point and a portion of the boot on line $x$ $x$, Fig. 2. Fig. 4 is a perspective view of the point detached.

The letter A indicates the drill-boot point, and B the drill-boot. At its bottom the point A is provided with a lip or flange, $c$, which diverges on each side of the point to a point, $g$, near the rear thereof, and then commences to converge, the converging rear portions of this lip or flange $c$ being somewhat broader than the forward portions, and turned upward, so that each occupies an upwardly and outwardly oblique position, which enables them to turn a portion of the earth which is turned up by the point inward behind said point and upon the furrow formed by it, so as to cover the seed which has been spread upon the bottom of said furrow by the spreader E, which is a round bar extending rearwardly through the point from its front, and lying in the path of the seed as it drops from the boot. As the stream of falling seed strikes this spreader it is divided and portions deflected toward opposite sides of the furrow.

The bottoms of the converging portions $d$ of the lip or flange, it will be observed, are inclined or raised upward slightly from the level of the bottom surface of the forward portion of the point, in order to leave a space, $f$, and clear the seed which has been spread in the furrow. Were this space $f$ not left under these converging portions of the lip or flange, it is obvious that said portions would drag or crowd the seed toward the center of the furrow and thus counteract the effect of the spreader.

Covering devices heretofore used in drills have simply scraped the surface-earth over the seed, and this surface-earth being usually dry at the time of seeding, a proper germination of the seed was not obtained; but by my point it will be seen that the fresh earth turned up by the point is caught by the oblique portions $d$ of the lip or flange and thrown inwardly, covering the seed evenly with moist mellow soil, so that it is planted under conditions most favorable for its germination and subsequent growth.

I am aware that a drill-point having lips or shares turned upward and outward from its rear portion for the purpose of turning earth in upon the furrow is not new, and I lay no claim to such a drill-point.

Having now described and explained the operation of my invention, I claim—

A drill-boot point provided with an outward-projecting bottom flange, $c$, diverging from the front edge of the point on each side thereof, and then converging and inclined transversely upward and outward, as at $d$, the converging portions of said flange having their bottom surfaces or edges, as at $f$, above the level of the bottom surface of the forward portion of the point and flange, whereby said rear converging portions are prevented from dragging or disturbing the seed in the furrow, while serving to cover said seed with fresh earth turned up by the point, substantially as shown and described.

In testimony that I claim the foregoing I have hereunto set my hand in the presence of the subscribing witnesses.

JOHN A. JONES.

Witnesses:
  ALBERT H. NORRIS,
  JAMES M. WRIGHT.